(12) United States Patent
Lupi et al.

(10) Patent No.: US 8,109,299 B2
(45) Date of Patent: Feb. 7, 2012

(54) FILLING VALVE HAVING A LIQUID CHAMBER, A GAS CHAMBER AND A MEDIUM CHAMBER, AND FILLING MACHINE COMPRISING THE SAME

(75) Inventors: Andrea Lupi, Octeville-sur-Mer (FR); Roberto Cuoghi, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 880 days.

(21) Appl. No.: 11/997,001

(22) PCT Filed: Jul. 28, 2005

(86) PCT No.: PCT/EP2005/009210
§ 371 (c)(1),
(2), (4) Date: Jul. 10, 2008

(87) PCT Pub. No.: WO2007/016958
PCT Pub. Date: Feb. 15, 2007

(65) Prior Publication Data
US 2009/0100799 A1    Apr. 23, 2009

(51) Int. Cl.
*B65B 3/04* (2006.01)
*B65B 31/04* (2006.01)
(52) U.S. Cl. ............ 141/48; 141/64; 141/144; 141/192; 141/198; 141/392
(58) Field of Classification Search .............. 141/47–48, 141/63–64, 144–146, 192, 198, 392
See application file for complete search history.

(56) References Cited

U.S. PATENT DOCUMENTS

| 3,779,293 | A | * | 12/1973 | Kaiser | 141/39 |
|---|---|---|---|---|---|
| 4,369,820 | A | * | 1/1983 | Ahlers et al. | 141/39 |
| 4,386,635 | A | * | 6/1983 | Ahlers et al. | 141/6 |
| 4,509,565 | A | * | 4/1985 | Ahlers | 141/39 |
| 4,557,301 | A | * | 12/1985 | Jo/ rss | 141/5 |
| 4,757,847 | A | * | 7/1988 | Jorss et al. | 141/198 |
| 4,787,427 | A |   | 11/1988 | Bacroix et al. | |
| 5,000,234 | A | * | 3/1991 | Weiss | 141/6 |
| 5,082,033 | A | * | 1/1992 | Weiss | 141/39 |

(Continued)

FOREIGN PATENT DOCUMENTS
DE   10025577   *   2/2001
(Continued)

*Primary Examiner* — Gregory Huson
*Assistant Examiner* — Nicolas A Arnett
(74) *Attorney, Agent, or Firm* — Sughrue Mion, PLLC

(57) ABSTRACT

A filling valve (12) including: a hollow housing (21); a moving valve assembly (24) slidingly mounted in the housing (21), the moving valve assembly (24) and the hollow housing (21) together defining a liquid chamber (30) and a gas chamber (32); a liquid inlet (46) for putting the liquid chamber (30) into communication with a liquid supply pipe (14); a gas inlet (47) for putting the gas chamber (32) into communication with a gas supply pipe (17); wherein the hollow housing (21) and the moving valve assembly (24) together define a medium chamber the (33) located between the liquid chamber (30) and the gas chamber (32), and wherein the filling valve (12) further comprises: a first diaphragm (35) linking the valve assembly (24) to the housing (21) between the liquid chamber (30) and the medium chamber (33), and a second diaphragm (36) linking the valve assembly (24) to the housing (21) between the gas chamber (32) and the medium chamber (33).

10 Claims, 7 Drawing Sheets

U.S. PATENT DOCUMENTS

| | | | |
|---|---|---|---|
| 5,273,082 A * | 12/1993 | Paasche et al. | 141/6 |
| 5,377,726 A * | 1/1995 | Clusserath | 141/39 |
| 5,501,253 A * | 3/1996 | Weiss | 141/40 |
| 5,634,500 A * | 6/1997 | Clusserath et al. | 141/48 |
| 5,735,434 A * | 4/1998 | Rayner | 222/1 |
| 5,826,748 A * | 10/1998 | Qian et al. | 222/1 |
| 6,079,460 A * | 6/2000 | Ballan et al. | 141/145 |
| 6,192,946 B1 * | 2/2001 | Clusserath | 141/40 |
| 6,192,947 B1 * | 2/2001 | Ballan et al. | 141/49 |
| 6,237,651 B1 * | 5/2001 | Fuin et al. | 141/250 |
| 6,463,964 B2 * | 10/2002 | Clusserath | 141/40 |
| 6,601,618 B2 * | 8/2003 | Tsukano et al. | 141/45 |
| 6,817,386 B2 * | 11/2004 | Tsukano et al. | 141/57 |
| 6,892,771 B2 * | 5/2005 | Stocchi | 141/129 |
| 7,647,950 B2 * | 1/2010 | Clusserath | 141/56 |
| 7,963,305 B2 * | 6/2011 | Lupi et al. | 141/258 |
| 2002/0179177 A1 | 12/2002 | Tsukano et al. | |

FOREIGN PATENT DOCUMENTS

EP 0601514 A1 6/1994

* cited by examiner

US 8,109,299 B2

FILLING VALVE HAVING A LIQUID CHAMBER, A GAS CHAMBER AND A MEDIUM CHAMBER, AND FILLING MACHINE COMPRISING THE SAME

FIELD OF THE INVENTION

The invention relates to a filling valve for filling a container with a pressurized filling liquid such as a carbonated drink, and to a filling machine including such a filling valve.

BACKGROUND OF THE INVENTION

U.S. Pat. No. 6,601,618 and European patent application No. EP 1 101 998 both disclose a filling valve having a hollow valve rod slidingly mounted in a valve housing. The valve rod is provided with a through hole defining a gas passage, and a liquid passage is defined between the outer periphery of the valve rod and the inner periphery of the housing. A diaphragm connects the valve rod to the housing in order to isolate the liquid chamber and a pressure chamber provided to control the vertical position of the valve rod.

In normal operational conditions, such a structure is somewhat satisfactory. However, as soon as the diaphragm breaks, or even if a small leakage occurs at the level of the diaphragm, the liquid can contaminate the pressure chamber, thereby resulting in improper operation of the filling valve. The filling machine must be stopped until the proper maintenance is achieved. This causes losses of productivity.

SUMMARY OF THE INVENTION

It is an object of the invention to provide a filling valve, the operation of which is safer.

The proposed filling valve comprises:
a hollow housing;
a moving valve assembly slidingly mounted in the housing, said moving valve assembly and said hollow housing together defining a liquid chamber and a gas chamber;
a liquid inlet for putting said liquid chamber into communication with a liquid supply pipe;
a gas inlet for putting said gas chamber into communication with a gas supply pipe;
wherein said hollow housing and moving valve assembly together define a medium chamber located between the gas chamber and the liquid chamber,
and wherein said filling valve further comprises:
a first diaphragm linking the valve assembly to the housing between the liquid chamber and the medium chamber, and
a second diaphragm linking the valve assembly to the housing between the gas chamber and the medium chamber.

In the event of a diaphragm failure, for instance a diaphragm breaking, liquid (or gas) fills the medium chamber and is not allowed to the gas (or liquid) chamber, since there is very low risk that both diaphragms fail at the same time. Accordingly, there is no need to stop the filling until the machine is stopped to achieve the necessary maintenance. Productivity is therefore preserved.

The above and other objects and advantages of the invention will become apparent from the detailed description of preferred embodiments, considered in conjunction with the accompanying drawings.

DESCRIPTION OF A PREFERRED EMBODIMENT

Figure 1:
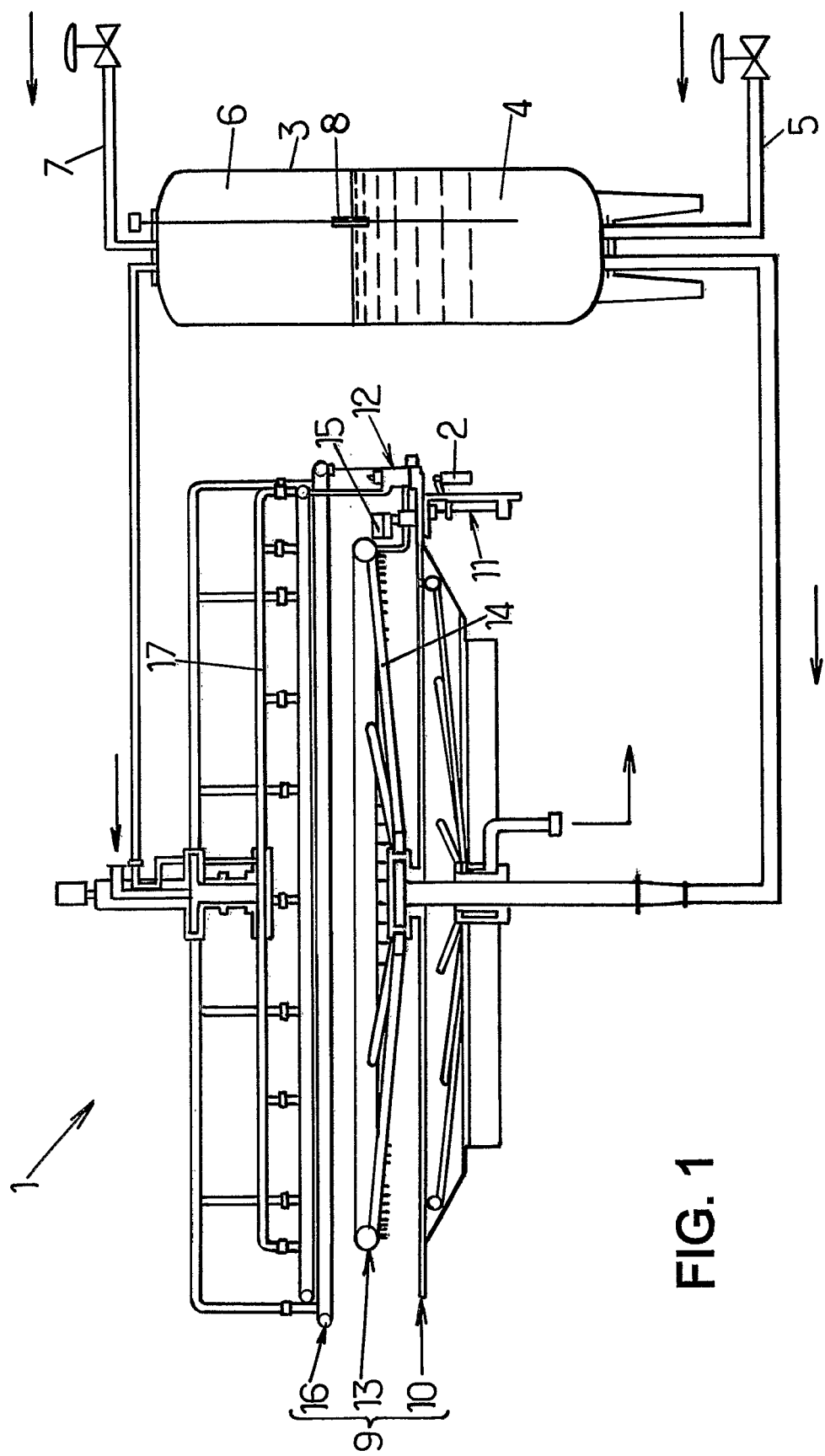
FIG. 1 is a schematic side elevational section view of a filling machine according to the invention.

Referring to FIG. 1, there is shown a filling machine 1 for filling containers 2 with a pressurized filling liquid (such as mineral water, soft drink, beer and the like), saturated with a gas such as $CO_2$.

The filling machine 1 comprises a vessel-shaped storage tank 3 defining a liquid space 4 in communication with a liquid supply duct 5 and an overlying gas space 6 in communication with a gas supply duct 7.

The liquid is maintained at a predetermined level by means of a control device including a level probe 8 located inside the storage tank 3, whereas the gas is maintained at a predetermined pressure equal to or above the liquid saturation pressure at the storage tank temperature, so that the filling liquid is constantly $CO_2$-saturated, in equilibrium with the overlying gas space 6.

The filling machine 1 is of the rotary type, and comprises a carrousel 9 rotated by drive means (not shown) and including:
a lower plate 10 provided with a plurality of peripheral container support arrangements 11 (one of which is partly shown on FIG. 2), and with a plurality of corresponding filling valves 12,
a medium plate 13 including a plurality of radial liquid supply pipes 14, each of which is in communication with the liquid space 4 of the storage tank 3 and connected to a filling valve 12 via a flow meter 15, and
an upper plate 16 including a plurality of radial gas supply pipes 17 in communication with the gas space 6 of the storage tank 3 and connected to the filling valves 12.

The container support arrangement 11 includes a support arm 18, an upper end 19 of which is forked to cooperate with a collar 20 of a container 2 to be filled through the corresponding filling valve 12.

The filling uses the so-called isobaric method. Such a method, well explained in the European patent application No. EP 0 375 912, has two main features. First, before being filled with liquid, the container 2 is previously filled with pressurized gas from the storage tank 3; second, the liquid leaves the filling valve 12 at a level which is lower than the level of the liquid space 4 in the storage tank 3.

Figure 3:
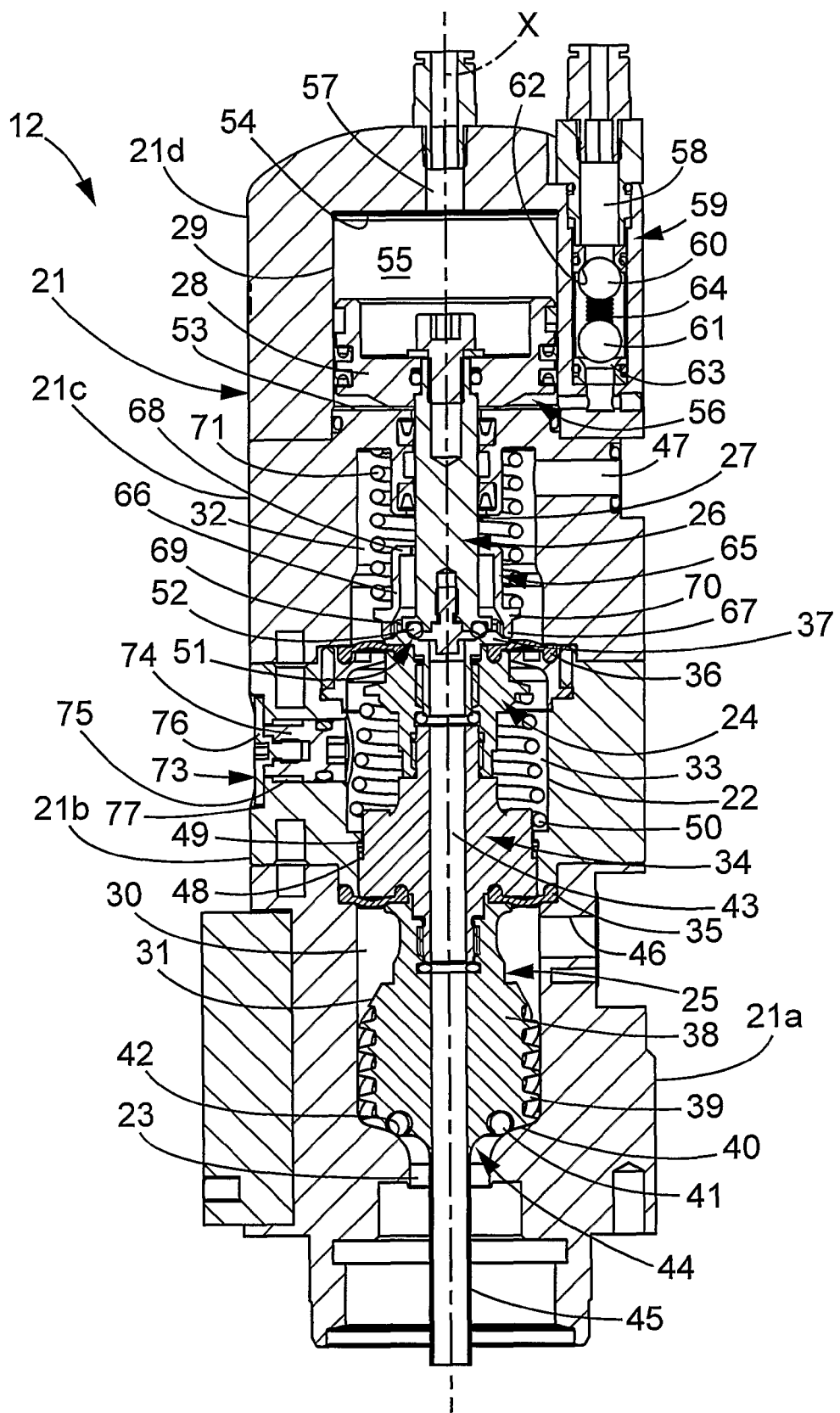
FIG. 3 is a side elevational section view showing a filling valve according to the invention, in a closed configuration.

As depicted on FIG. 3, the filling valve 12 comprises a cylindrical hollow housing 21 having an inner bore 22 formed around a vertical main axis X and opened to form an aperture 23 at a bottom end of the housing 21, and a moving valve assembly 24 slidingly mounted in the housing 21 along the main axis X. The housing 21 is formed by superposition of four cylindrical coaxial stages 21a, 21b, 21c, 21d screwed to each other, i.e. a lower housing stage 21a, a first medium housing stage 21b, a second medium housing stage 21c, and an upper housing stage 21d.

The moving valve assembly 24 comprises two stages movable with respect of each other, i.e. a lower stage formed of a hollow valve rod 25, and an upper stage formed of a piston 26 having a cylindrical piston body 27 and a piston head 28 slidingly received in an air chamber 29 formed of a cylindrical bore in the upper housing stage 21d.

As depicted on FIG. 3, the valve assembly 24 and the housing 21 together define:
- a liquid chamber 30 formed between the outer periphery of a lower part 31 of the valve rod and the inner periphery of the housing bore 22 in the lower housing stage 21a;
- a gas chamber 32 formed between the outer periphery of the piston body 27 and the inner periphery of the housing bore 22 in the second medium housing stage 21c, and
- a medium chamber 33 formed between the outer periphery of an upper part 34 of the valve rod 25 and the inner periphery of the housing bore 22 in the first medium housing stage 21b, i.e. between the liquid chamber 30 and the gas chamber 32.

The valve 12 comprises a first or lower diaphragm 35, linking the valve assembly 24 and the housing 21. The lower diaphragm 35 is held liquid tight on the one hand between the lower part 31 and the upper part 34 of the valve rod 25, on the other hand between the lower housing stage 21a and the first medium housing stage 21b, whereby the lower diaphragm 35 forms a liquid tight flexible seal between the liquid chamber 30 and the medium chamber 33.

The valve 12 further comprises a second or upper diaphragm 36, linking the valve assembly 24 and the housing 21 at a distance above the lower diaphragm 35. The upper diaphragm 36 is held gas tight, on the one hand at an upper end 37 of the upper part 34 of the valve rod 25, on the other hand between the first medium housing stage 21b and the second medium housing stage 21c, whereby the upper diaphragm 36 forms a gas tight flexible seal between the gas chamber 32 and the medium chamber 33.

Figure 4:
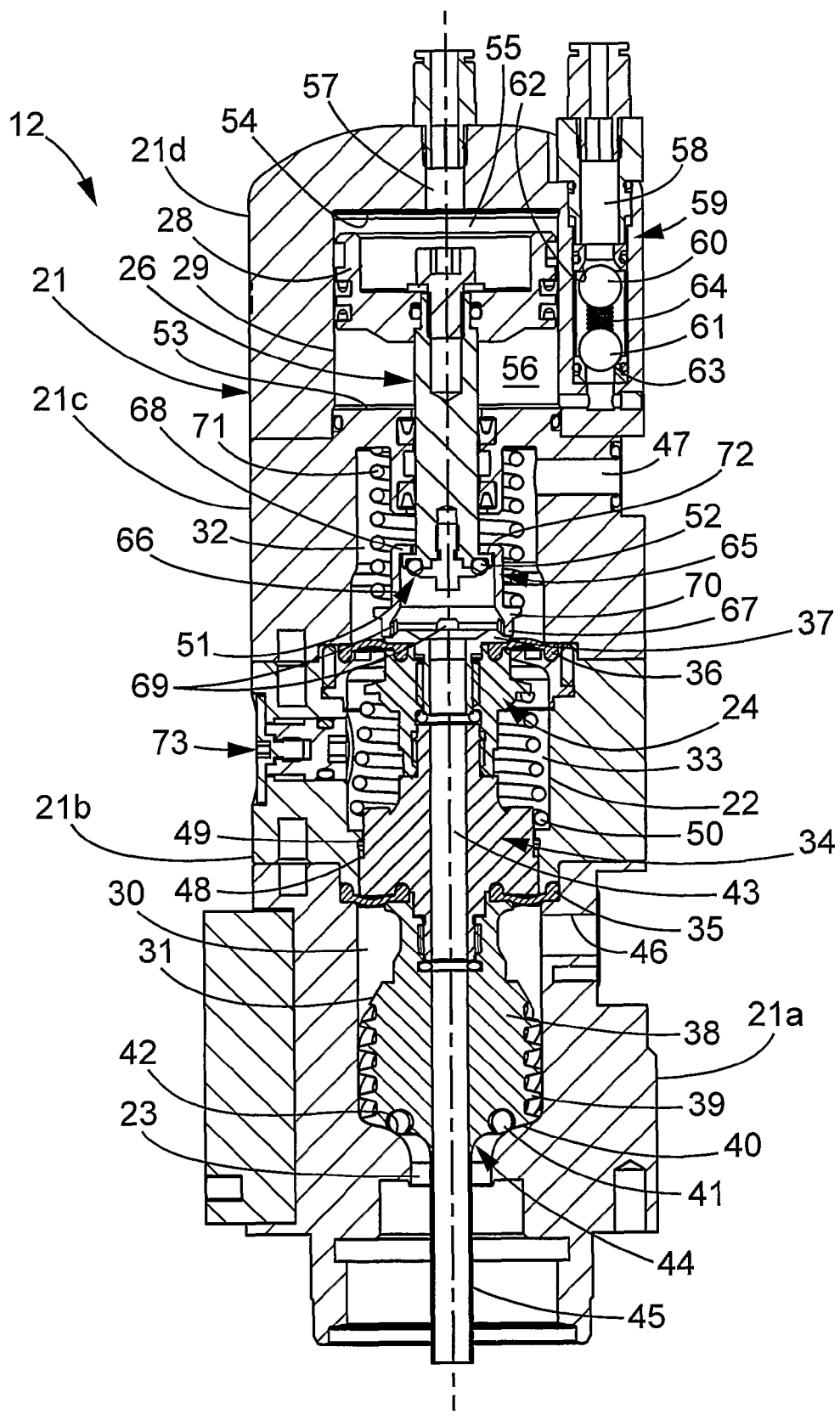
FIG. 4 is a view similar to FIG. 3, showing the filling valve in a gas filling configuration.
Figure 5:
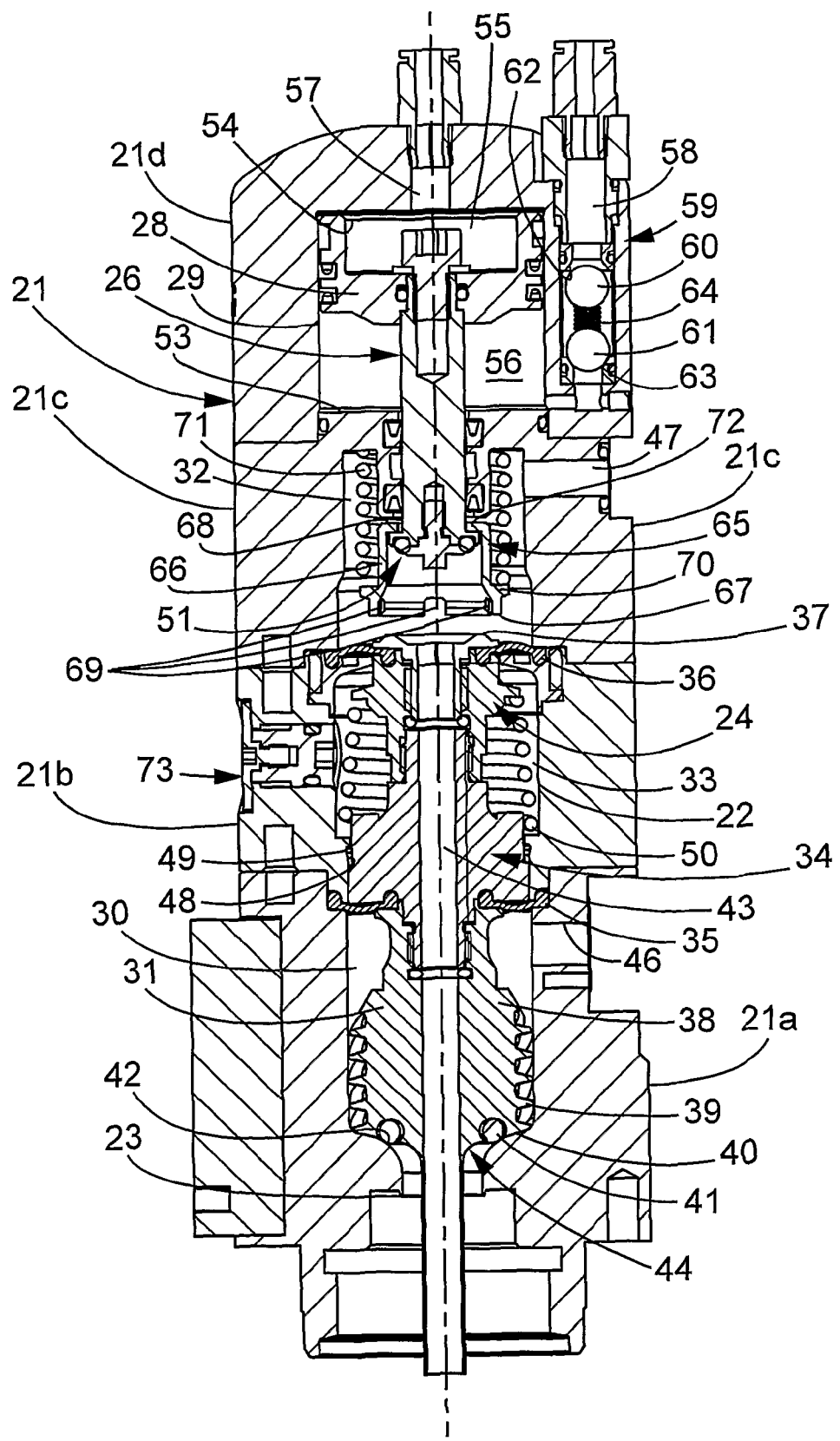
FIG. 5 is a view similar to FIGS. 3 and 4, showing the filling valve in a gas filling configuration.

The lower part 31 of the valve rod 25 forms a filling head 38 having a peripheral helical rib 39 cooperating with the inner periphery of the housing bore 22 and defining an annular contact surface 40 provided with a seal element 41 which abuts, in a liquid tight manner, a valve seat 42 formed in the vicinity of the housing aperture 23, in a closed position of the valve rod 25, shown on FIGS. 3, 4 and 5.

The valve rod 25 comprises a through hole 43 corresponding to the hollow portion of the valve rod 25 and constituting a gas passage for putting the gas chamber 32 in communication with the inside of the container 2. At the upper end 37 of the valve rod 25, the through hole 43 constituting the gas passage opens in the gas chamber 32, whereas at a lower end 44 of the valve rod 25 a gas pipe 45 axially protrudes from the filling head 38 to extend the through hole 43 towards the container 2.

The valve 12 also comprises a liquid inlet 46 formed by a through hole in the lower housing stage 21a for putting the liquid chamber 30 in communication with the liquid supply pipe 14, and a gas inlet 47 formed by a through hole in the second medium housing stage 21c for putting the gas chamber 32 in communication with the gas supply pipe 17.

The valve rod 25 is axially movable with respect of the housing 21, under certain conditions which will be disclosed hereafter, between:
- a closed position (FIGS. 3, 4, 5) in which the contact surface 40 is in liquid tight contact with the valve seat 42, thereby preventing the liquid from flowing from the liquid chamber 30 through the housing aperture 23, and
- an open position (FIG. 6) in which the valve rod 25 is elevated with respect of the closed position so that the contact surface 40 is spaced from the valve seat 42, thereby allowing the liquid to flow through the housing aperture 23, the helical rib 39 ensuring that the liquid flow is laminar.

The upper part 34 of the valve rod 25 is provided with an annular shoulder surface 48 which abuts, in the open position, against a corresponding annular stop surface 49 formed on the inner periphery of the housing bore 22 in the first medium housing stage 21b in order to limit the course of the valve rod 25.

The valve 12 comprises a first, lower, conical compression return spring 50, located in the medium chamber 33, and which permanently upwardly biases the valve rod 25 towards its open position. The upwardly axially oriented force exerted on the valve rod 25 by the lower spring 50 is referenced T1.

The piston body 27 has a lower end 51 provided with a seal member 52 which abuts against an annular seat formed by the upper end 37 of the valve rod 25 around the opening of the through hole 43, in a gas tight manner.

The piston 26 is axially slidingly mounted with respect of the housing 21, between
- a closed position (FIG. 3) in which the lower end 51 of the piston body 27 is in contact with the upper end 37 of the valve rod 25 and in which the piston head 28 is located near a lower surface 53 of the air chamber 29, thereby preventing gas from flowing through the through hole 43 constituting the gas passage, and
- an open position (FIGS. 5 and 6) in which the piston 26 is elevated with respect of the closed position so that the lower end 51 of the piston body 27 is spaced from the upper end 37 of the valve rod 25, the piston head 28 abutting against an upper surface 54 of the air chamber 29, thereby allowing gas to flow from the gas chamber 32 to the inside of the container 2 through the through hole 43 constituting the gas passage.

The piston 26 is of the double effect type, its position being air controlled by means of a pressure differential between an upper air chamber 55 defined between the piston head 28 and the upper surface 54 of the air chamber 29, and a lower air chamber 56 defined between the piston head 28 and the lower surface 53 of the air chamber 29.

The valve 12 further comprises a first air inlet 57 directly opening in the upper air chamber 55, and a second air inlet 58 opening in the lower air chamber 56 through a control valve 59 provided with a pair of movable balls 60, 61, i.e.
- a first, upper ball 60 having a closed position in which it abuts against a corresponding upper valve seat 62 in an air tight manner (FIG. 3), thereby preventing upstream airflow through the valve seat 62, and an open position in which the upper ball 60 is spaced from its valve seat 62 (FIGS. 4, 5 and 6), thereby allowing air to flow through the same up- and downstream, and
- a second, lower ball 61 having a closed position in which it abuts against a corresponding lower valve seat 63 in an air tight manner (FIGS. 4, 5 and 6), thereby preventing downstream airflow through the valve seat 63, and an open position in which the lower ball 61 is spaced from its valve seat 63 (FIG. 3), thereby allowing air to flow through the valve seat up- and downstream.

The balls 60, 61 are permanently biased away from each other (i.e. towards their respective closed positions) through a compression spring 64 interposed between them.

Air pressure from the first air inlet 57 is referenced P1, whereas air pressure from the second air inlet 58 is referenced P2. P1 is more than the sum of P2 and the overpressure resulting from the biasing force of the compression spring 64.

Air permanently comes under pressure P2 from the second air inlet 58. When the upper air chamber 55 is fed with air under pressure PE, the piston head 28 is moved downwards until the lower end 51 of the piston body 27 comes into abutment against the upper end 37 of the valve rod 25. The lower ball 61 is opened by the increasing pressure in the lower air chamber 56, whereas the upper ball 60 is closed, thereby preventing upstream airflow due to the overpressure in the lower air chamber 56 with respect of the second air inlet 58.

When the air feeding from the first air inlet 57 stops, the overpressure in the lower air chamber moves the piston head 28 upwards, until the piston head 28 comes into abutment with the upper surface 54 of the air chamber 29. Air feeding in the lower air chamber 56 is stopped when the lower ball 61 closes, under pressure differential between the second air inlet 58 and the lower air chamber 56, well before the piston 26 reaches its open position (see FIG. 4), thereby allowing smooth contact of the piston head 28 with the upper surface 54 of the air chamber 29.

As depicted on FIG. 3, the valve 12 further comprises a cup 65 slidingly mounted on the piston body 27 in the gas chamber 32. The cup 65 has a cylindrical peripheral wall 66 which surrounds the piston body 27 and defines a lower edge 67, and a top wall 68 slidingly contacting a peripheral outer surface of the piston body 27.

On its lower edge 67, the peripheral wall 66 is provided with cut-outs 69 forming gas passages which permanently allow gas to pass radially through the peripheral wall 66.

Figure 6:
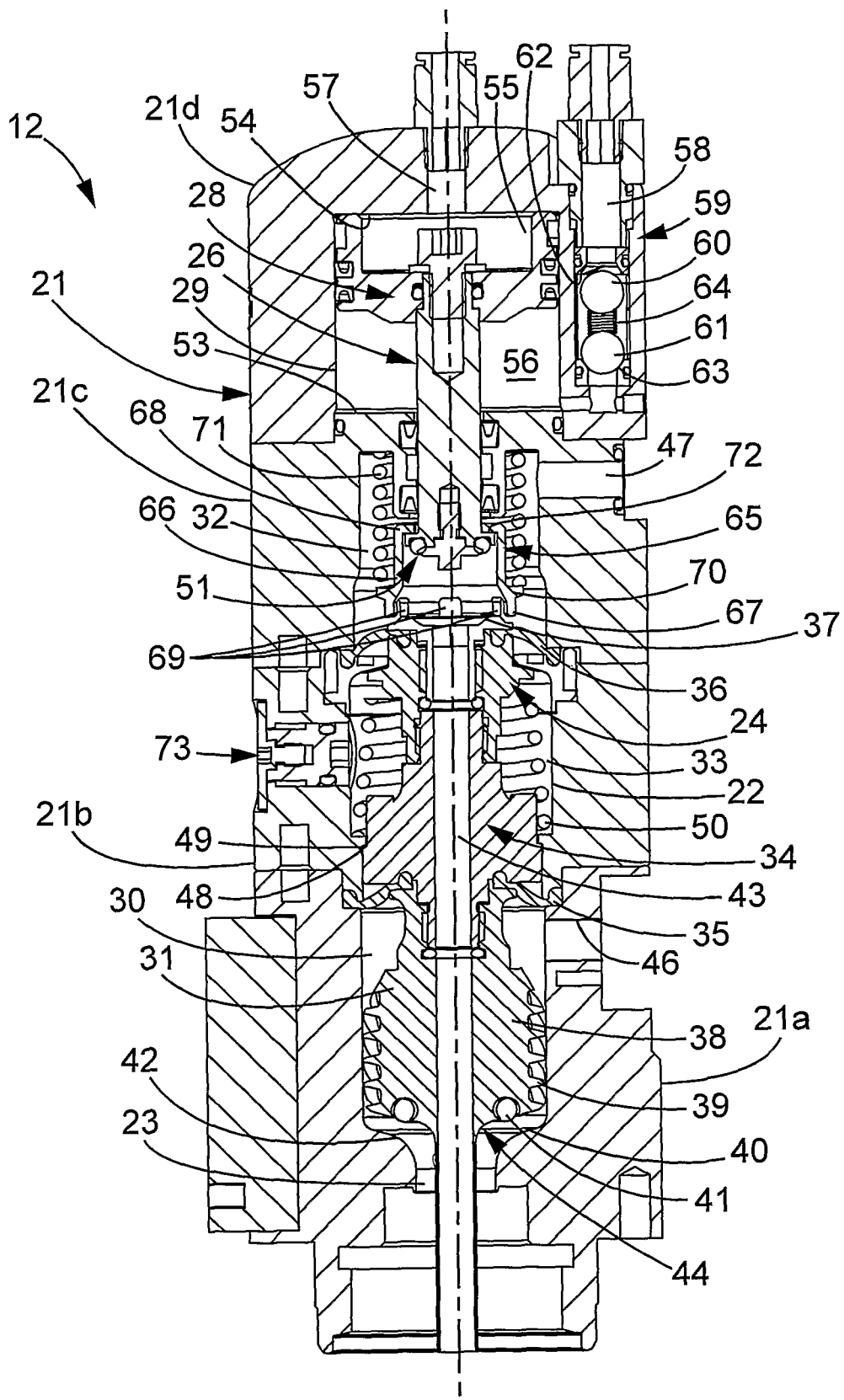
FIG. 6 is a view similar to FIGS. 3 to 5, showing the filling valve in a liquid filling configuration.

The cup 65 is slideable, with respect of the valve assembly 24, between a lower position, illustrated on FIGS. 3 and 4, in which the lower edge 67 abuts against the upper end 37 of the valve rod 25, and a higher position, illustrated on FIGS. 5 and 6, in which the cup 65 is elevated with respect of the lower position, under action of the piston 26, whereby the cup 65 is located at a distance from the valve rod 25.

As depicted on FIG. 3, the cup 65 is also provided, in the vicinity of its lower edge 67, with a radial annular flange 70, forming a contact surface for a second, upper, compression return spring 71 located in the gas chamber 32, and interposed between the housing 21 and the cup 65 for permanently downwardly biasing the cup 65 towards its lower position. The downwardly axially oriented force exerted on the cup 65 by the upper spring 71 is referenced T2.

It shall be understood that, in the lower position of the cup 65, the upper spring 71 also biases the valve rod 25 toward its closed position, since the cup 65 is in abutment against the upper end 37 of the valve rod 25.

As depicted on FIGS. 4 and 5, the piston 26 is provided with a shoulder surface 72 which, during the course of the piston 26 toward its open position, abuts against the top wall 68 of the cup 65, thereby displacing the same toward its higher position.

Accordingly, the valve assembly 24 can have three configurations, depending upon the respective positions of the valve rod 25, the piston 26 and the cup 65, namely:

- a closed configuration, illustrated on FIG. 3, in which both the valve rod 25 and the piston 26 are in their closed position, whereas the cup 65 is in its lower position;
- a gas filling configuration, in which the valve rod 25 is in its closed position, whereas the piston 26 is in its open position and the cup 65 in its higher position (FIG. 5), and
- a liquid filling configuration, in which both the valve rod 25 and the piston 26 are in their open position, whereas the cup 65 is in its higher position (FIG. 6).

Moreover, the springs 50, 71 and the upper and lower ends 37, 44 of the valve rod 25 are so dimensioned that:

$$P_g \times S2 > T1 \tag{1}$$

$$P_g \times S2 < T1 + P_g \times S1 \tag{2}$$

and $$T2 + P_g \times S2 > T1 + P_g \times S1 \tag{3}$$

where:

T1 is the upwardly axially oriented force exerted on the valve rod 25 by the lower spring 50;

T2 is the downwardly axially oriented force exerted on the cup 65 by the upper spring 71;

$P_g$ is the gas pressure in the gas chamber 32;

S1 is the surface area, considered axially, of the lower end 44 of the valve rod 25 exposed to the gas pressure in the container 2; and S2 is the surface area, considered axially, of the upper end 37 of the valve rod 25 exposed to the gas pressure in the gas chamber 32.

As depicted on FIG. 3, the valve 12 further comprises a diaphragm failure sensor 73, comprising a piston 74 slidingly mounted in a bore 75 formed in the housing 21 at the level of the first medium housing stage 21b, and a signal member 76 formed of a pellet attached to one end of the piston 74 opposed to the medium chamber 33 and visually accessible from the outside of the housing 21.

Under normal operational conditions, the medium chamber 33 is filled with air under atmospheric pressure, whereby the failure sensor 73 is in a so-called "normal operation" position (FIGS. 3 to 6), in which the pellet constituting the signal member 76 is received in a corresponding recess 77 formed in an outer surface of the housing 21.

As soon as the lower diaphragm 35 or the upper diaphragm 36 is no more liquid or, respectively, gas tight, e.g. after the diaphragm 35 or 36 has reached its fatigue limit, there is a liquid or gas leakage from the liquid or, respectively, from the gas chamber 32 toward the medium chamber 33 through the failing diaphragm 35 or 36. The resulting overpressure in the medium chamber 33, with respect of the atmospheric pressure, radially pushes the piston 74 toward a so-called "failure" position in which the piston 74 partly protrudes radially outside from the housing 21, whereby the signal member 76 extends at a distance from its recess 77, thereby signaling that a diaphragm failure occurred.

In one embodiment, the failure sensor 73 is of the passive type, i.e. it only provides "normal operation" or "failure information" concerning the valve 12.

In another embodiment, the failure sensor 73 is of the active type, i.e. it is electrically or mechanically connected to a machine control system (not shown) to stop operation of the same and shut off both gas and liquid feeding.

Given the presence of two diaphragms 35, 36, the risk of gas and liquid mutual contamination is very low in the event one of the diaphragms 35 or 36 fails (e.g. the diaphragm 35 or 36 breaks).

Given the presence of the failure sensor 73, either the machine operator is immediately warned that a diaphragm failure occurred, so that he can stop the machine and achieve (or ask for) the appropriate maintenance (in the meantime the machine still runs, so that productivity is maintained), or the machine is automatically stopped by its control system under displacement of the failure sensor 73.

Figure 2:
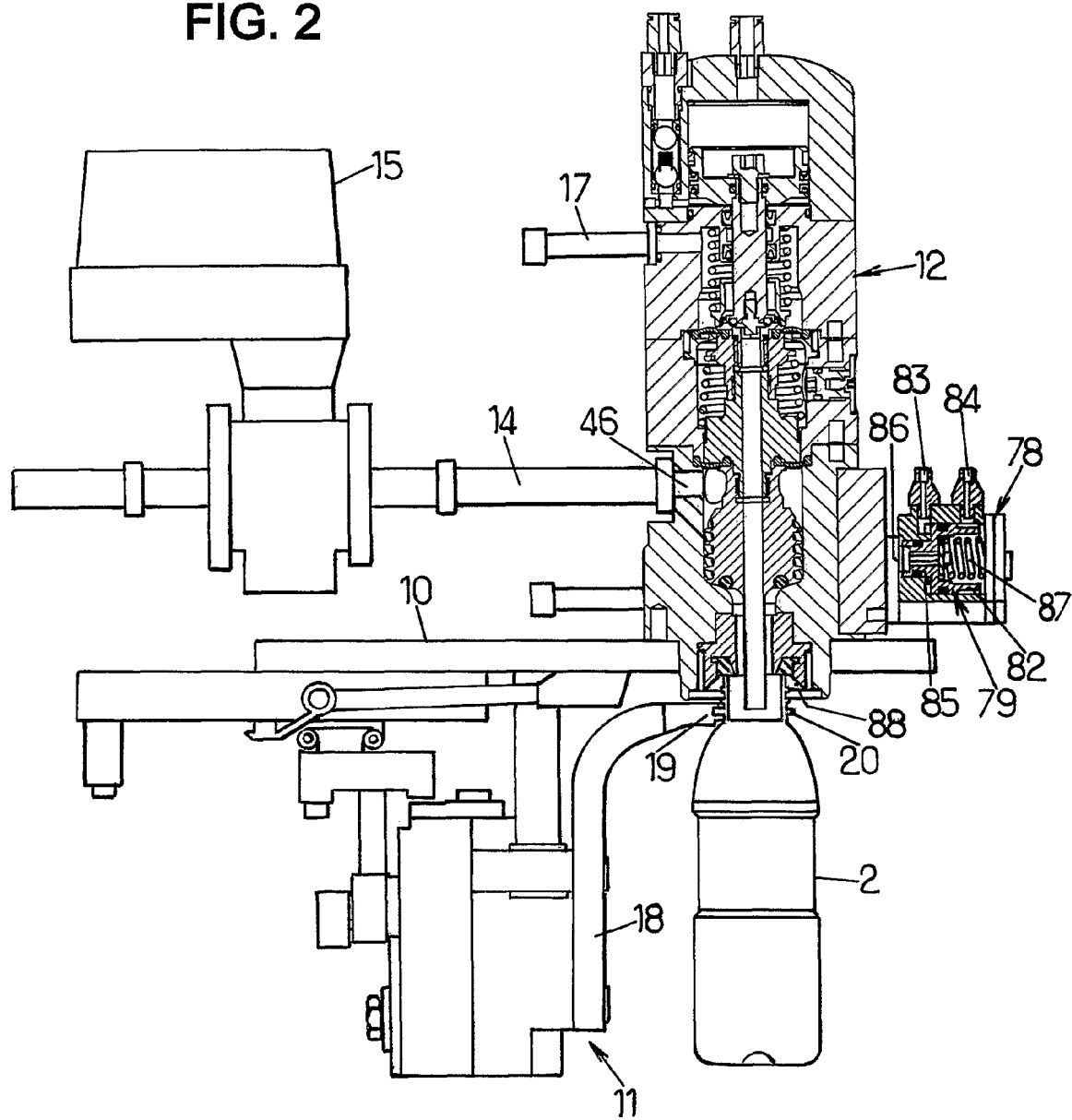
FIG. 2 is a side elevational section view showing a detail of the filling machine of FIG. 1.
Figure 7:
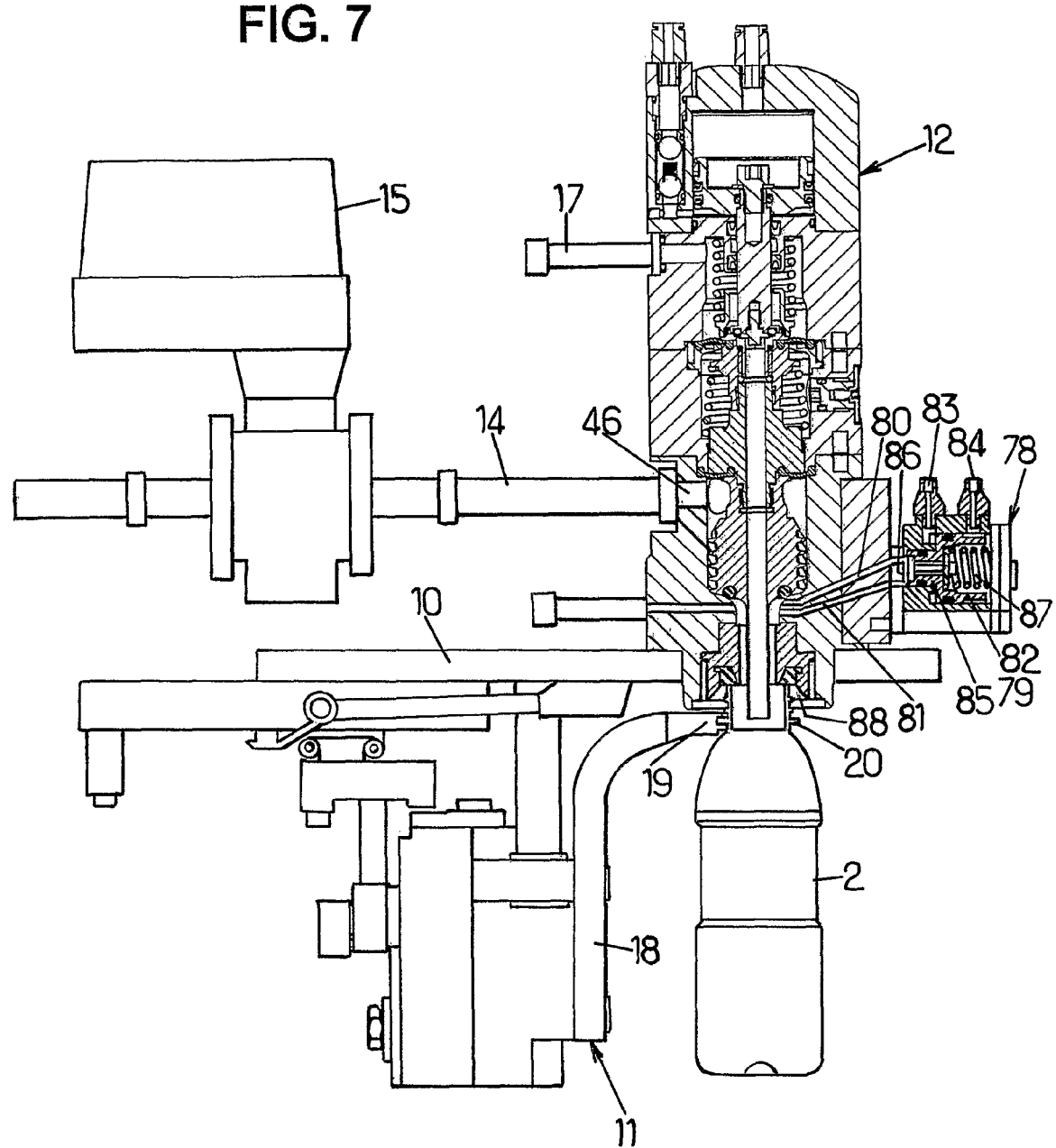
FIG. 7 is a view similar to FIG. 2, showing an air exhaust operation of the container.

As depicted on FIGS. 2 and 7, the valve 12 is provided with a snifter valve 78 including a double effect piston 79 slideable between an open position (FIG. 7) in which it puts an exhaust conduit 80 formed in the housing 21 and opening in the bore 22 at the level of its aperture 23 (i.e. in the vicinity of the valve seat 42) in communication with an exhaust pipe 81 opening to the atmosphere, and a closed position in which the piston 79 shuts the exhaust conduit 80.

More precisely, the piston 79 has a head 82, the position of which is controlled by an air pressure differential on both sides thereof via air ducts 83, 84 sequentially feeding the snifter valve 78 with pressurized air, and a body 85, an end of which can be put in gas tight contact with a side surface 86 of the housing 21, where both the exhaust conduit 80 and the exhaust pipe 81 open.

In the open position of the piston 79, the end of the piston body 85 is spaced from the side surface 86, thereby putting the exhaust conduit 80 in communication with the exhaust pipe 81 and allowing the overpressure gas to flow from the container 2 to the atmosphere, until the gas pressure in the container 2 has reached a predetermined pressure wherein it can no more compensate the force exerted on the piston 79 by the air pressure, cumulated with the biasing force of a return spring 87 permanently biasing the piston 79 toward its closed position.

Such an exhausting operation (also called snift operation) prevents the $CO_2$-saturated liquid from foaming when the container 2 is separated from the valve 12 at the end of the filling.

The filling operations are now described.

Starting from the closed configuration of the valve assembly 24, a container 2 (such as a bottle) is attached to the valve 12 at the bore aperture 23 through a gas tight joint assembly 88.

Air is fed to the lower air chamber 56 through the second air inlet 58 via the control valve 59, thereby putting the piston 26 in its open position and the cup 65 in its higher position. In other words, the valve assembly 24 is put in its gas filling configuration. Pressurized gas is thereby allowed to inside of the container 2 through the through hole 43 constituting the gas passage. Equation (1) is verified as long as the gas pressure in the container 2 is lower than the gas pressure $P_g$ in the gas chamber 32 (which is equal to the gas pressure in the gas space 6 of the storage tank 3), so that the valve rod 25 remains in its closed position.

Once the gas pressure equilibrium is reached, i.e. once the gas pressure in the container 2 has reached the gas pressure $P_g$ in the gas chamber 32, equation (2) is verified, so that the valve rod 25 is elevated under the upwardly directed force exerted by the lower spring 50 and the force resulting from the gas pressure $P_g$ in the container 2, the sum of which is greater than the downwardly directed force exerted on the valve rod 25 by the gas pressure $P_g$ in the gas chamber 32. The valve assembly 24 then occupies its liquid filling configuration.

Liquid is thereby allowed to flow from the liquid chamber 30 to the container 2 through the aperture 23, until the flow meter 15 has measured the predetermined amount of liquid substantially corresponding to the volume of the container 2.

The liquid flow is then stopped under control of the flow meter 15, whereas the piston 26 is displaced to its closed position, thereby shutting off the through hole 43 to the container 2. The cup 65 is back to its lower position, in which the upper spring 71 downwardly biases the valve rod 25. Equation (3) is therefore verified, the valve assembly 24 being back to its closed configuration.

The snifter valve 78 is then put in its open position, thereby allowing the exhausting of part of the mixture of air and $CO_2$ overlying above the liquid in the container 2.

More precisely, since air is lighter than $CO_2$, the exhausted gas essentially consists of air, the remaining gas in the container 2 essentially consisting of $CO_2$.

Accordingly, it shall be understood that operation of the valve assembly 24, and more specifically the transition from the gas filling configuration to the liquid filling configuration, is gas pressure-controlled, thereby allowing automatic opening of the valve rod 25.

The invention claimed is:

1. A filling valve (12) comprising:
a hollow housing (21);
a moving valve assembly (24) slidingly mounted in the housing (21), said moving valve assembly (24) and said hollow housing (21) together defining a liquid chamber (30) and a gas chamber (32);
a liquid inlet (46) for putting said liquid chamber (30) into communication with a liquid supply pipe (14);
a gas inlet (47) for putting said gas chamber (32) into communication with a gas supply pipe (17);
wherein said hollow housing (21) and said moving valve assembly (24) together define a medium chamber (33) located between the liquid chamber (30) and the gas chamber (32), and wherein said filling valve (12) further comprises:
a first diaphragm (35) linking the valve assembly (24) to the housing (21) between the liquid chamber (30) and the medium chamber (33), and
a second diaphragm (36) linking the valve assembly (24) to the housing (21) between the gas chamber (32) and the medium chamber (33),
and wherein said moving valve assembly (24) includes a hollow valve rod (25) provided with a through hole (43) opening in said gas chamber (32) at an upper end (37) of said valve rod (25).

2. The filling valve (12) according to claim 1, further comprising a diaphragm failure sensor (73), mounted on the housing (21) at the level of the medium chamber (33).

3. The filling valve (12) according to claim 2, wherein the diaphragm failure sensor (73) comprises a piston (74) slidingly mounted in a bore (75) formed in the housing (21) at the level of the medium chamber (33), and a signal member (76) attached to the piston (74) and visually accessible from the outside of the housing (21).

4. The filling valve according to claim 3, wherein said signal member (76) is formed of a pellet attached to one end of the piston (74) opposed to the medium chamber (33).

5. The filling valve (12) according to claim 1, wherein said hollow valve rod (25) is slideable with respect of the housing (21) between an open position in which the valve rod (25) opens an aperture (23) in the housing (21), thereby allowing liquid to flow from the liquid chamber (30) through said aperture (23), and a closed position in which the valve rod (25) closes said aperture (23),
and wherein said valve assembly (24) further comprises a piston (26) slidingly mounted in the housing between an open position in which a lower end (51) of the piston (26) is spaced from the upper end (37) of the valve rod (25), thereby allowing gas to pass from the gas chamber (32) to the through hole (43) in the valve rod (25) through the opening formed at the upper end (37) thereof, and a closed position in which the lower end (51) of the piston (26) is in sealing contact with the upper end (37) of the valve rod (25).

6. The filling valve according to claim 5, comprising a return spring (50) permanently biasing the valve rod (25) toward its open position.

7. The filling valve according to claim 6, wherein said return spring (50) is received in said medium chamber (33).

8. The filling valve according to claim 5, further comprising a cup (65) received in the gas chamber (32), and slidingly mounted with respect of the piston (26) between a lower position, in which a lower edge (67) of the cup (65) abuts against the upper end (37) of the valve rod (25), and a higher position in which the cup (65) is spaced from the upper end (37) of the valve rod (25), said cup (65) being provided with cut-outs (69) for allowing gas to pass from the gas chamber (32) to the through hole (43) through the cut-outs (69), said valve further comprising a return spring (71) permanently biasing said cup (65) toward its lower position.

9. The filling valve (12) according to claim 8, wherein, in its open position, the piston (26) maintains the cup (65) in its higher position.

10. A filling machine (1) comprising a rotary carrousel (9) equipped with a plurality of valves (12) according to claim 1, and further comprising a storage tank (3) comprising a liquid space (4) in communication with the liquid chamber (30) of each valve (12) and an overlying gas space (6) in communication with the gas chamber (32) of the valve (12).

* * * * *